United States Patent [19]

Hunger et al.

[11] Patent Number: 4,987,258
[45] Date of Patent: Jan. 22, 1991

[54] 4,4′-DIAMINODIPHENYL COMPOUNDS, PROCESS FOR THEIR PREPARATION AND THEIR USE

[75] Inventors: Klaus Hunger, Kelkheim; Heinrich Frölich, Niedernhausen/Taunus; Kurt C. Habig, Mörfelden-Walldorf, all of Fed. Rep. of Germany

[73] Assignee: Hoechst Aktiengesellschaft, Frankfurt am Main, Fed. Rep. of Germany

[21] Appl. No.: 17,062

[22] Filed: Feb. 20, 1987

Related U.S. Application Data

[63] Continuation of Ser. No. 844,848, Mar. 27, 1986, abandoned.

[51] Int. Cl.$^5$ ............................................. C07C 87/50
[52] U.S. Cl. .................... 564/309; 534/561; 534/565; 564/312; 564/314
[58] Field of Search ............ 564/309, 312, 314

[56] References Cited

FOREIGN PATENT DOCUMENTS 553887 3/1958 Canada ............................... 564/312

Primary Examiner—Robert V. Hines
Attorney, Agent, or Firm—Connolly & Hutz

[57] ABSTRACT

The invention relates to 4,4′-diaminodiphenyl compounds of the formula I

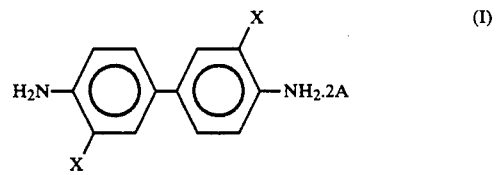

in which X denotes the n-propyl, isopropyl, n-butyl, isobutyl, 1-methylpropyl, n-propoxy, isopropoxy, isobutoxy, 1-methylpropoxy or 2-methoxyethoxy radical and A is 0 or the equivalent of an inorganic acid.

The preparation is effected by reducing ortho-X-substituted nitrobenzene and benzidine rearrangement of the resulting hydrazobenzene derivative. The compounds of the formula (I) are suitable for use as components in the preparation of dyes and pigments.

8 Claims, No Drawings

4,4'-DIAMINODIPHENYL COMPOUNDS, PROCESS FOR THEIR PREPARATION AND THEIR USE

CROSS-REFERENCE

This application is a continuation of application Ser. No. 844,848 filed Mar. 27, 1986 and now abandoned, by Klaus Hunger, Heinrich Frolich and Kurt C. Habig for 4,4'-diaminodiphenyl Compounds, Process For Their Preparation and Their Use.

The invention relates to 4,4'-diaminodiphenyl compounds which are suitable for preparing dyes and pigments.

Of the 4,4'-diaminodiphenyls, compounds which are substituted in the 3,3'-position by methyl, methoxy or ethoxy groups play an important part in particular as bisdiazo components for dyes, such as direct dyes, acid dyes, leather dyes, developing dyes, as dye bases, as components for sulfur dyes and as bisdiazo components and in coupling components for disazo pigments. We have now found other compounds which belong to this class of substances and which can be advantageously used for preparing new dyes and pigments.

The present invention provides 4,4'-diaminodiphenyl compounds of the formula I

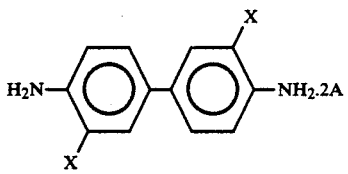

in which X denotes the n-propyl, isopropyl, n-butyl, isobutyl, 1-methylpropyl, n-propoxy, isopropoxy, isobutoxy, 1-methylpropoxy or 2-methoxyethoxy radical and A is 0 or the equivalent of an inorganic acid.

Preference is given to compounds of the formula I in which the inorganic acid is hydrochloric acid or sulfuric acid.

Particular interest attaches to compounds of the formula I in which X denotes the isopropyl radical.

Particular interest also attaches to compounds of the formula I in which X denotes the n-propoxy, isopropoxy, isobutoxy, 1-methylpropoxy or 2-methoxyethoxy radical.

The present invention also provides a process for preparing a compound of the general formula I, which comprises reducing a compound of the formula II

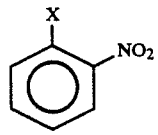

in which X has the meaning mentioned in the compound of the formula I, in an alkaline medium to the compound of the formula III

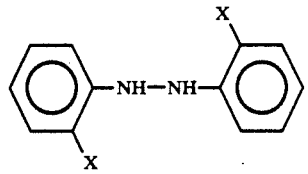

in which X has the meaning mentioned in the compound of the formula I, then rearranging the compound of the formula III by treatment with an acid and isolating the resulting product in the form of the free diamine, or its salt, of the formula I.

The reduction of the nitrobenzene derivatives of the formula II can be effected analogously to known reduction processes, for example in an aqueous basic medium with zinc dust, with sodium amalgam, with hydrogen and metal catalysts, in particular palladium/carbon catalysts, or electrolytically. The reduction can be carried out in homogenous solution or in the two-phase system in the presence of solubilizers, such as alcohols or hydrocarbons. Preference is given to the reduction with zinc dust in sodium hydroxide solution.

The formation of the desired hydrazobenzene derivative of the formula III in the reduction is usually accompanied by the formation, as a byproduct, of the amino compound which corresponds to formula II-compound reduced at the nitro group. The byproduct is advantageously separated off before the hydrazobenzene derivative is processed further, which is usually possible in a simple manner by extraction.

The resulting hydrazobenzene derivative of the formula III is then rearranged in an acid medium analogously to known methods. Suitable rearranging agents are usually strong inorganic acids in aqueous or aqueous-alcoholic solution. It is also possible to use solutions of hydrogen chloride in organic solvents or strong organic acids. Particular interest attaches to the method wherein the solution of the hydrazo compound is stirred together with an organic solvent such as ether, toluene, chlorobenzene, solvent naphtha or the like with aqueous mineral acids such as hydrohalic acids, sulfuric acid, phosphoric acid or nitric acid.

Preferably the hydrazobenzene derivative or a solution thereof is treated in an organic solvent with hydrochloric acid or aqueous sulfuric acid at 5° to 50° C., in particular at 15° to 30° C. The reaction time of the rearrangement depends on the pH value and the specific hydrazobenzene derivative and is relatively shortest in a mineral acid medium.

The rearrangement product can be isolated from the crude product mixture, possibly after purification steps, such as filtration, washing out with organic solvents, resolution or recrystallization, in the form of the 4,4'-diaminodiphenyl compound of the formula I in which A is a radical of the acid from the rearrangement reaction. Alternatively, the crude product mixture, possibly after the above-mentioned purification steps, can be neutralized, and the rearrangement product can be obtained as the free diamine of the formula I (A=0). In individual cases it is advisable to purify the rearrangement product in the form of the free diamine and then to convert it with the same acid as in the rearrangement or some other suitable acid into salts of the formula I (A=inorganic acid), and to isolate.

The invention further provides the use of the compounds of the formula I for preparing colorants.

In particular, the compounds of the formula I are suitable for preparing disazo compounds for colorants which are obtained by bisdiazotization of the compounds according to the invention and reaction with coupling components.

Examples of colorants which may be mentioned are: dyes, such as direct dyes, anionic dyes (acid dyes), leather dyes, cationic dyes, developing dyes or sulfur dyes, and also disazo pigments.

To prepare disazo compounds, the diamines according to the invention are bisdiazotized by known methods, for example with sodium nitrite in aqueous hydrochloric acid solution or with nitrosylsulfuric acid in sulfuric acid solution or in organic solvents with aliphatic organic nitrites, and subsequently reacted with two equivalents of a coupling component. Suitable coupling components are for example hydroxynaphthalenes and any compound derived therefrom, such as hydroxynaphthalenesulfonic acids, hydroxyaminonaphthalenesulfonic acids, 2-hydroxynaphthalene-3-carboxylic acid, 2-hydroxynaphthalene-3-carboxylic arylides, but also active methylene compounds, such as acetoacetarylides or malonic acid dianilides and heterocyclic couplable compounds, such as barbituric acids, 2,4-dihydroxyquinoline or pyridones, such as 4-methyl-5-cyanopyrid-2-one.

The compounds of the formula I are further suitable for use as constituent of bifunctional coupling components which are obtained for example by bisdiketenization of the diaminodiphenyl derivatives according to the invention and are used for disazo pigments and dyes.

However, the compounds of the formula I are also suitable for preparing bisazomethine dyes and pigments which are obtained for example by reacting the diamines with aldehydes. To be mentioned here in particular are aromatic and heterocyclic aldehydes, for example the so-called Fischer aldehyde ((1,3,3-trimethyl-2,3-dihydro-1-H-indol-2-ylidene)acetaldehyde).

Furthermore, the compounds according to the invention can also be reacted with aromatic hydrocarbons and sulfur to give sulfur dyes.

The compounds of the formula I produce dye bases for Naphtol AS dyeing with improved wet fastness and, after diazotization and coupling, disazo direct dyes on cotton with in some cases surprisingly high tinctorial strength.

The examples below will describe the invention in more detail. The mutagenicity test was carried out, following Ames, with Salmonella typhimurium (strains TA 98, TA 100, TA 1535, TA 1537, TA 1538) in the absence and presence of S-9-mix (B. N. Ames et al., Mut. Res. Vol. 31, p. 347-364 (1975)).

EXAMPLE 1

An iron apparatus equipped with horseshoe stirrer and heating and cooling means is charged with 300 g of o-nitro-isopropylbenzene, 390 g of solvent naphtha and 360 g of zinc dust. The reaction mixture is raised to about 65° C. with stirring and first 26 g of 50% strength sodium hydroxide solution and then 23 g of water are added with temporary cooling. To complete the reduction, stirring is continued at a temperature of about 70° C. and in the presence of further zinc dust (60 g) until a spot test with the reaction solution shows a colorless runoff. By further addition of water the zinc oxide hydrate is then grained and filtered off. The organic filtrate contains the 2,2'-diisopropylhydrazobenzene and the byproduct 1-isopropyl-2-aminobenzene in solution.

After extraction of the byproduct with dilute hydrochloric acid the organic filtrate is added dropwise at 15° to 20° C. to 40% strength sulfuric acid and stirring is continued until the rearrangement reaction has ended (test: hydrazo compound no longer detectable). After neutralization with aqueous ammoniacal solution the hot organic phase is separated off and extracted with dilute hydrochloric acid while hot. The extraction solution is clarified with Carboraffin, and the product is separated out of the hydrochloric acid filtrate by addition of concentrated hydrochloric acid. This gives 157 g of 3,3-diisopropylbenzidine dichlorohydrate having a diazotization value of 99%, melting point: 288° C. The compound is negative in the Ames mutagenicity test.

EXAMPLE 2

An iron apparatus equipped with horseshoe stirrer and heating and cooling means is charged with 293 g of o-nitro-isobutoxybenzene, 395 g of solvent naphtha and 220 g of zinc dust. The reaction mixture is heated with stirring to 80° C., and first 24 g of 50% strength sodium hydroxide solution and then 21 g of water are added with temporary cooling. To complete the reduction, stirring is continued at 80° C. with the addition of further zinc dust a little at a time (in total 53 g) until a spot test with the reaction solution shows a colorless runoff. By further addition of water the zinc oxide hydrate is then grained. The zinc oxide hydrate is then separated by filtration from the organic phase containing the 2,2'-diisobutoxyhydrazobenzene and as byproduct 1-isobutoxy-2-aminobenzene. After extraction of the byproduct with dilute hydrochloric acid the organic phase is added dropwise at 15°-20° C. to hydrochloric acid and stirring is continued at 25° C. until the rearrangement reaction has ended (test: hydrazo compound no longer detectable). The crude product is purified by filtration, dissolving in hot water and clarification of the solution with Carboraffin. Precipitation with concentrated hydrochloric acid gives 106 g of 3,3'-diisobutoxybenzidine dichlorohydrate having a diazotization value of 96%, melting point 270° C.

A portion of the product obtained is neutralized with an aqueous ammonia solution and dissolved. By extraction in the heat and crystallization in the cold it is possible to obtain 3,3'-diisobutoxybenzidine having a melting point of 91° C. The compound is negative in the Ames mutagenicity test.

EXAMPLE 3

An iron apparatus equipped with horseshoe stirrer and heating and cooling means is charged with 326 g of o-nitro-(2-methoxyethoxy)-benzene, 320 g of solvent naphtha and 270 g of zinc dust. The reaction is heated with stirring to about 70° C. and first 34 g of 35% strength sodium hydroxide solution and then 38 g of water are added with temporary cooling. To complete the reduction, stirring is continued at 70° C. in the presence of further zinc dust until a spot test with the reaction solution shows a colorless runoff. By further addition of water the zinc oxide hydrate is grained. The latter is then separated by filtration from the organic phase containing the 2,2'-di-(2-methoxyethoxy)-hydrazobenzene and the byproduct 1-(2-methoxyethoxy)-2-aminobenzene. After extraction of the byproduct with dilute hydrochloric acid the organic phase is added dropwise at 12° to 15° C. to 30% strength hydrochloric acid, and stirring is continued at 25° C. until the rearrangement reaction has ended (test: hydrazo compound no longer detectable). This is followed by neutralization with aqueous ammonia solution and separation at 85° to 90° C. from the organic phase. The 3,3'-di(2-methoxyethoxy)-benzidine is made to precipitate by stirring until cold. Recrystallization from water gives 176 g of product having a diazotization value of 98.8%, melting point: 116° C. The compound is negative in the Ames mutagenicity test.

The table below lists further preparation examples of compounds of the formula I:

| Example | X | A | Melting point [°C.] | Ames test |
|---------|---|---|---------------------|-----------|
| 4 | n-C$_3$H$_7$ | HCl | 288 | negative |
| 5 | n-C$_4$H$_9$ | HCl | 270 | negative |
| 6 | —CH$_2$CH(CH$_3$)$_2$ | HCl | 258 | negative |
| 7 | —CH(CH$_3$)—CH$_2$—CH$_3$ | HCl | 270 | negative |
| 8 | -n-OC$_3$H$_7$ | HCl | 273 | negative |
| 9 | —OCH(CH$_3$)$_2$ | HCl | 256 | negative |
| 10 | —O—CH(CH$_3$)CH$_2$CH$_3$ | HCl | 240 | negative |

We claim:

1. A non-mutagenic 4,4'-diaminodiphenyl compound of the formula I

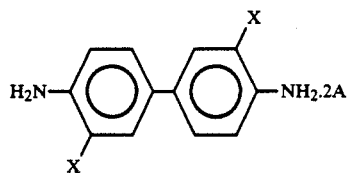

in which X denotes the n-propyl, isopropyl, n-butyl, isobutyl, 1-methylpropyl, n-propoxy, isopropoxy, isobutoxy, 1-methylpropoxy or 2-methoxyethoxy radical and A is 0 or the equivalent of an inorganic acid.

2. A non-mutagenic compound as claimed in claim 1, wherein the inorganic acid is hydrochloric acid or sulfuric acid.

3. A non-mutagenic compound as claimed in claim 1, wherein X denotes the propyl, isopropyl, n-butyl, isobutyl or 1-methylpropyl radical.

4. A non-mutagenic compound as claimed in claim 1, wherein X denotes the n-propoxy, isopropoxy, isobutoxy, 1-methylpropoxy or 2-methoxyethoxy radical.

5. A non-mutagenic compound as claimed in claim 1, wherein X is the isopropyl radical.

6. A process for preparing colorants using the compound as claimed in claim 1.

7. A process for preparing disazo direct dyes using the compound as claimed in claim 1 as a tetrazo component.

8. A process for preparing developing dyes by azoic dyeing using the compound as claimed in claim 1 as the dye base.

* * * * *